United States Patent
Chen et al.

(10) Patent No.: US 11,626,785 B2
(45) Date of Patent: Apr. 11, 2023

(54) MOTOR COMMUNICATION WAVEFORM GENERATING CIRCUIT

(71) Applicant: HOYI ELECTRONIC TECHNOLOGY CO., LTD., Tainan (TW)

(72) Inventors: Chi-Yang Chen, Tainan (TW); Min-Fu Hsieh, Tainan (TW)

(73) Assignee: HOYI ELECTRONIC TECHNOLOGY CO., LTD., Tainan (TW)

( * ) Notice: Subject to any disclaimer, the term of this patent is extended or adjusted under 35 U.S.C. 154(b) by 0 days.

(21) Appl. No.: 17/541,978

(22) Filed: Dec. 3, 2021

(65) Prior Publication Data
US 2023/0077368 A1 Mar. 16, 2023

(30) Foreign Application Priority Data
Sep. 10, 2021 (TW) ................... 110133819

(51) Int. Cl.
*H02K 29/08* (2006.01)
*H02P 27/08* (2006.01)
*H02K 11/33* (2016.01)
*H02K 11/215* (2016.01)

(52) U.S. Cl.
CPC ........... *H02K 29/08* (2013.01); *H02K 11/215* (2016.01); *H02K 11/33* (2016.01); *H02P 27/08* (2013.01)

(58) Field of Classification Search
CPC .. H02P 6/00; H02P 6/005; H02P 6/007; H02P 6/08; H02P 6/12; H02P 6/14; H02P 6/15; H02P 6/153; H02P 6/16; H02P 6/26; H02P 6/28; H02P 6/32; H02P 7/29; H02P 7/293; H02P 7/30; H02P 8/00; H02P 8/02; H02P 8/22; H02P 8/34; H02P 21/00; H02P 21/18; H02P 21/22; H02P 8/18; H02P 25/00; H02P 25/022; H02P 25/062; H02P 25/066; H02P 25/064; H02P 25/86; H02P 25/89; H02P 27/00; H02P 27/047; H02P 27/04; H02P 27/06; H02P 27/08

See application file for complete search history.

(56) References Cited

U.S. PATENT DOCUMENTS 8,405,329 B2 * 3/2013 Shimizu ................ H02P 6/16
318/400.26

* cited by examiner

*Primary Examiner* — Antony M Paul
(74) *Attorney, Agent, or Firm* — Juan Carlos A. Marquez; Marquez IP Law Office, PLLC

(57) ABSTRACT

A motor commutation waveform generating circuit is provided. The motor commutation waveform generating circuit includes: an edge detection circuit, configured to receive sensing signals of the motor and derive a clock signal indicating a commutation switching point of the motor; an angle cutting circuit, controlled by the clock signal to generate an angle indication pulse indicating a rotation angle of the motor; a synthetic wave generating circuit, using the angle indication pulse to sequentially change waveform voltages corresponding to required angles and output them in segments; and a signal combining circuit, controlled by the clock signal to combine waveform voltage signals generated by the synthetic wave generating circuit, thereby obtaining a plurality of synthetic waveforms provided to a drive control system of the motor for drive control after pulse width modulation.

10 Claims, 16 Drawing Sheets

| Angle | Sin voltage value | Resistance | Angle | Sin voltage value | Resistance |
|---|---|---|---|---|---|
| 0 | 1 | 0 | 180 | 1 | 0 |
| 5 | 1.087156 | 17.43115 | 185 | 0.912844 | 182.5689 |
| 10 | 1.173648 | 34.72964 | 190 | 0.826352 | 165.2704 |
| 15 | 1.258819 | 51.76381 | 195 | 0.741181 | 148.2362 |
| 20 | 1.34202 | 68.40403 | 200 | 0.65798 | 131.596 |
| 25 | 1.422618 | 84.52365 | 205 | 0.577382 | 115.4763 |
| 30 | 1.5 | 100 | 210 | 0.5 | 100 |
| 35 | 1.573576 | 114.7153 | 215 | 0.426424 | 85.28471 |
| 40 | 1.642788 | 128.5575 | 220 | 0.357212 | 71.44248 |
| 45 | 1.707107 | 141.4214 | 225 | 0.292893 | 58.57864 |
| 50 | 1.766044 | 153.2089 | 230 | 0.233956 | 46.79111 |
| 55 | 1.819152 | 163.8304 | 235 | 0.180848 | 36.16959 |
| 60 | 1.866025 | 173.2051 | 240 | 0.133975 | 26.79492 |
| 65 | 1.906308 | 181.2616 | 245 | 0.093692 | 18.73844 |
| 70 | 1.939693 | 187.9385 | 250 | 0.060307 | 12.06148 |
| 75 | 1.965926 | 193.1852 | 255 | 0.034074 | 6.814835 |
| 80 | 1.984808 | 196.9616 | 260 | 0.015192 | 3.038449 |
| 85 | 1.996195 | 199.2389 | 265 | 0.003805 | 0.76106 |
| 90 | 2 | 200 | 270 | 0 | 0 |
| 95 | 1.996195 | 199.2389 | 275 | 0.003805 | 0.76106 |
| 100 | 1.984808 | 196.9616 | 280 | 0.015192 | 3.038449 |
| 105 | 1.965926 | 193.1852 | 285 | 0.034074 | 6.814835 |
| 110 | 1.939693 | 187.9385 | 290 | 0.060307 | 12.06148 |
| 115 | 1.906308 | 181.2616 | 295 | 0.093692 | 18.73844 |
| 120 | 1.866025 | 173.2051 | 300 | 0.133975 | 26.79492 |
| 125 | 1.819152 | 163.8304 | 305 | 0.180848 | 36.16959 |
| 130 | 1.766044 | 153.2089 | 310 | 0.233956 | 46.79111 |
| 135 | 1.707107 | 141.4214 | 315 | 0.292893 | 58.57864 |
| 140 | 1.642788 | 128.5575 | 320 | 0.357212 | 71.44248 |
| 145 | 1.573576 | 114.7153 | 325 | 0.426424 | 85.28471 |
| 150 | 1.5 | 100 | 330 | 0.5 | 100 |
| 155 | 1.422618 | 84.52365 | 335 | 0.577382 | 115.4763 |
| 160 | 1.34202 | 68.40403 | 340 | 0.65798 | 131.596 |
| 165 | 1.258819 | 51.76381 | 345 | 0.741181 | 148.2362 |
| 170 | 1.173648 | 34.72964 | 350 | 0.826352 | 165.2704 |
| 175 | 1.087156 | 17.43115 | 355 | 0.912844 | 182.5689 |
| 180 | 1 | 0 | | | |

FIG. 8

MOTOR COMMUNICATION WAVEFORM GENERATING CIRCUIT

BACKGROUND

Cross-Reference to Related Application

This application claims the benefit of Taiwan Patent Application No. 110133819, filed on 10 Sep. 2021, which is hereby incorporated by reference for all purposes as if fully set forth herein.

TECHNICAL FIELD

The disclosure relates to a motor commutation waveform generating circuit, in particular to a commutation waveform generating circuit for generating commutation waveforms used for motor drive and then applying them to motor drive control after pulse modulation.

RELATED ART

A frequency converter is a type of adjustable speed drive system used to smoothly control AC motor speed and torque by varying the frequency and amplitude of the AC motor operating voltage using variable-frequency drive technology. The most common type is the AC/AC converter whose input and output are both AC. Before the appearance of the frequency converter, for applications in which the motor speed is needed to be adjusted, they are completed through a DC motor, or through a VS motor with a built-in coupling machine that is used to reduce the actual speed of the motor during operation. The frequency converter simplifies the above operation, reduces the equipment volume and greatly reduces the maintenance ratio.

With the frequency converter, it can also run a motor in a pre-planned manner to further minimize mechanical and electrical stress. For example, generally, when a frequency converter is started, the speed will change continuously, while the acceleration will change discontinuously. In a conveyor application, in combination with the functions of an S-curve, the acceleration during acceleration and deceleration is also changed continuously in order for a smoother acceleration and deceleration process, which reduces the backlash that may occur when a conveyor is accelerating or decelerating.

There are many ways to drive a motor by a frequency converter. Among them, the simplest one is V/f scalar control in which the output voltage of the frequency converter is directly proportional to the output frequency, and the V/f scalar control is suitable for loads with constant torque. The relationship between voltage and frequency is referred to as V/f curve. Some frequency converters with V/f control have a curve whose output voltage is directly proportional to the square of output frequency, or a multi-segment settable V/f curve. Two commonly used drive technologies, vector control and direct torque control (DTC), adjust the output voltage magnitude and angle according to the output current and motor speed so as to precisely control the motor's magnetic flux and torque.

The frequency converter outputs AC voltage using an inverter in a pulse width modulation (PWM) manner. Sinusoidal PWM is the most straightforward method used to adjust motor voltage and frequency. If the reference signal exceeds the carrier, the frequency converter will output a high potential, otherwise, the frequency converter will output a low potential, which can generate an output signal whose pulse width changes with time. The output signal is nearly sinusoidal after being filtered.

In the existing frequency converter, an embedded system with a microprocessor or digital signal processor as the core is needed to control the operation of the frequency converter. The related program is in the firmware of the microprocessor or digital signal processor. The frequency converter provides display information, variables and parameters related to function blocks, which can be modified by a user through an operator or communication to monitor and protect the frequency converter and the driven motor and equipment.

To adjust the magnitude and angle of the motor speed output voltage, it is needed to use an internal circuit of the microprocessor (CPU) or micro control unit (MCU) to generate commutation waveforms after mathematical operations, which are provided to a motor drive control system for drive control after pulse width modulation. During the operation of the internal circuit, there will be calculation delay, and it is also not easy for overall circuit integration, so the cost of the overall circuit is high.

SUMMARY

An objective of the disclosure is to provide a novel motor commutation waveform generating circuit, which is applicable to an arbitrary waveform synthesis circuit for motor drive system commutation, and does not use the micro control unit (MCU) algorithm or microprocessor (CPU) for calculation, so the cost is low and it is easy for high and low voltage circuit integration.

Another objective of the disclosure is to provide a motor commutation waveform generating circuit, which is applicable to a three-phase motor, is easy for circuit integration to provide commutation synthetic waveform signals and can be directly integrated with a drive circuit system. Similarly, the motor commutation waveform generating circuit is also easily applicable to a sensorless motor drive system to directly detect a drive motor output voltage and obtain commutation synthetic waveforms. The motor commutation waveform generating circuit is also applicable to a stepping motor drive system where two synthetic sinusoidal waveforms with a difference of 90 degrees are used for micro-stepping control. The motor commutation waveform generating circuit can easily expand and increase the angular resolution.

The disclosure provides a motor commutation waveform generating circuit, configured to generate a commutation synthetic waveform corresponding to a motor that is provided to a drive control system of the motor for drive control after pulse width modulation. The circuit includes: an edge detection circuit, configured to receive sensing signals of the motor and derive a clock signal indicating a commutation switching point of the motor; an angle cutting circuit, controlled by the clock signal to generate an angle indication pulse indicating a rotation angle of the motor; a synthetic wave generating circuit, using the angle indication pulse to sequentially change waveform voltages corresponding to required angles and output them in segments; and a signal combining circuit, controlled by the clock signal to combine waveform voltage signals generated by the synthetic wave generating circuit, thereby obtaining a plurality of synthetic waveforms provided to a drive system of the motor for control uses.

The sensing signals of the motor are Hall signals output by at least two Hall components, or the sensing signals of the motor are drive output voltage signals of the motor.

After the edge detection circuit receives the sensing signals of the motor, each of the sensing signals is subjected to pulse edge detection by a multivibrator and output to an OR gate for control to control a circuit clock of a D flip-flop, thereby deriving the clock signal. Since the point where the sensing signal is detected is the switching point at which the motor rotates 60 degrees, the derived clock signal generates an angular clock signal whose every half cycle represents a 60-degree angle.

The angle cutting circuit includes two capacitors, controlled by switches controlled by the clock signal to perform constant-current charge and discharge, respectively obtaining triangle wave voltage waveforms of a first voltage and a second voltage relative to the clock signal; two reference voltage generating modules, controlled by switches controlled by the clock signal to respectively receive the first voltage and the second voltage as inputs, thereby respectively outputting waveform signals of a first x voltage and a second x voltage that are x times the first voltage and the second voltage, where 0<x<1; and two comparators, respectively receiving the first voltage and first x voltage, and the second voltage and the second x voltage as inputs, and outputting the angle indication pulse through a latch after comparison.

The reference voltage generating module is capable of changing different x times using the angle indication pulse variation signal.

Each of the reference voltage generating modules includes an operational amplifier, a resistor divider network, a multiplexer and a shift register. The first voltage and the second voltage pass through the operational amplifier and generate a plurality of voltage values of different magnitudes to the multiplexer through the resistor divider network, and the angle indication pulse variation signal controls the multiplexer to switch to different reference potentials through the shift register and output the waveform signals of the first x voltage and the second x voltage.

The synthetic wave generating circuit includes an operational amplifier, a Sin value resistor divider network, and six sets of multiplexers and shift registers, and with a 2 V voltage and through division by the Sin value resistor divider network, the operational amplifier controls the multiplexers to switch to different reference potentials through the shift registers by the angle indication pulse variation signal and output six sets of different output waveform voltage signals.

The signal combining circuit includes a plurality of sets of multiplexers and shift registers, and the shift registers are controlled by the clock signal to control the multiplexers to combine the waveform voltage signals generated by the synthetic wave generating circuit, thereby obtaining a plurality of synthetic waveforms provided to the drive system of the motor for control uses.

The multiplexers of the signal combining circuit bring in the sensing signals of the motor such that the plurality of synthetic waveforms PH lag an arbitrary angle behind the sensing signal of the motor and synchronize therewith.

According to the disclosure, the commutation waveforms used for motor drive, such as sinusoidal waveforms or synthetic waveforms used for Field-Oriented Control (FOC) or arbitrary synthetic commutation waveforms, are generated and then applied to the motor drive control system after pulse modulation. In an implementation, for example, a clock signal every 60 degrees the three-phase motor rotates can be obtained by receiving sensing signal inputs of Hall components or by directly comparing drive-level output voltages without sensors. Every two clock intervals are cut into smaller equal divisions to generate smaller angle indication signals, thereby generating basic shapes of the waveforms in every 60 degrees, which are finally combined into a 360-degree arbitrary synthetic waveform for motor drive system commutation.

The disclosure has the following advantages: the disclosure is applicable to an arbitrary waveform synthesis circuit for motor drive system commutation, and does not use the MCU algorithm or CPU for calculation, so the cost is low and it is easy for high and low voltage circuit integration. The motor commutation waveform generating circuit is applicable to a three-phase motor, is easy for circuit integration, provides commutation synthetic waveform signals and can be directly integrated with a drive circuit system. Similarly, the motor commutation waveform generating circuit is also easily applicable to a sensorless motor drive system to directly detect a drive motor output voltage and obtain commutation synthetic waveforms.

The motor commutation waveform generating circuit of the disclosure is also applicable to a stepping motor drive system where two synthetic sinusoidal waveforms with a difference of 90 degrees are used for micro-stepping control. The motor commutation waveform generating circuit can easily expand and increase the angular resolution.

BRIEF DESCRIPTION OF THE DRAWINGS

FIG. 8 is a table showing the correspondence between sinusoidal Sin value and resistance.

DETAILED DESCRIPTION

Figure 1:
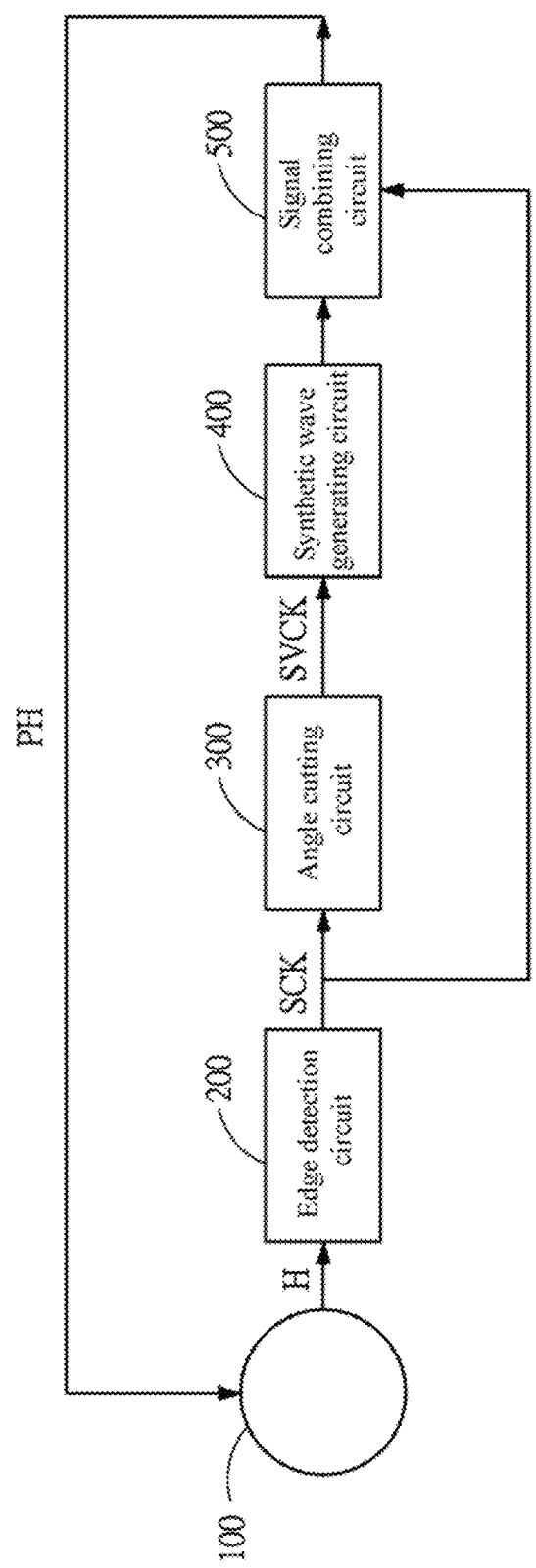
FIG. 1 is a block diagram of a motor commutation waveform generating circuit of the disclosure.

Embodiments of the disclosure are described in detail below with reference to the accompanying drawings, the accompanying drawings are mainly simplified schematic diagrams, and only exemplify the basic structure of the disclosure schematically. Therefore, only the components related to the disclosure are shown in the drawings, and are not drawn according to the quantity, shape, and size of the components during actual implementation. During actual implementation, the specification and size of the components are actually an optional design, and the layout of the components may be more complicated.

The following description of various embodiments is provided to exemplify the specific embodiments for implementation of the disclosure with reference to accompanying drawings. The directional terms mentioned in the disclosure, such as "above" and "below" merely refer to the directions in the accompanying drawings. Therefore, the used direction terms are intended to describe and understand this application, but are not intended to limit this application. In addition, in the specification, unless explicitly described as contrary, the word "include" is understood as referring to including the component, but does not exclude any other components.

According to the disclosure, commutation waveforms used for motor drive are generated, applied to a two-phase, three-phase or multiphase motor drive control system, and applied to a motor drive control system after pulse modulation. For example, a clock signal every 60 degrees the three-phase motor rotates can be obtained by receiving sensing signal inputs of Hall components or by directly comparing drive-level output voltages without sensors. Every two clock intervals are cut into smaller equal divisions to generate smaller angle indication signals, thereby generating basic shapes of the waveforms in every 60 degrees, which are finally combined into a 360-degree arbitrary synthetic waveform. A corresponding motor commutation synthetic waveform, such as a sinusoidal waveform a synthetic waveform used for FOC, is generated, provided to a motor drive control system for drive control after pulse width modulation, and provided for motor drive system commutation.

FIG. 1 is a block diagram of a motor commutation waveform generating circuit of the disclosure. The motor commutation waveform generating circuit of the disclosure includes: an edge detection circuit 200, configured to receive sensing signals H of the motor 100 and derive a clock signal SCK indicating a commutation switching point of the motor 100; an angle cutting circuit 300, controlled by the clock signal SCK to generate an angle indication pulse SVCK indicating a rotation angle of the motor 100; a synthetic wave generating circuit 400, using the angle indication pulse SVCK to sequentially change waveform voltages corresponding to required angles and output them in segments; and a signal combining circuit 500, controlled by the clock signal SCK to combine waveform voltage signals generated by the synthetic wave generating circuit 400, thereby obtaining a plurality of synthetic waveforms PH provided to a drive system of the motor 100 for control uses.

The disclosure has a motor commutation waveform synthesis and generating circuit with real-time and quick response, and has no MCU algorithm or CPU calculation delay. With simple circuits and capacitors, the circuit cost is low, it is easy for high and low voltage circuit integration, and the circuit can easily expand the resolution so as to accurately generate smaller motor rotation angles. A detailed implementation is described below.

Figure 2:
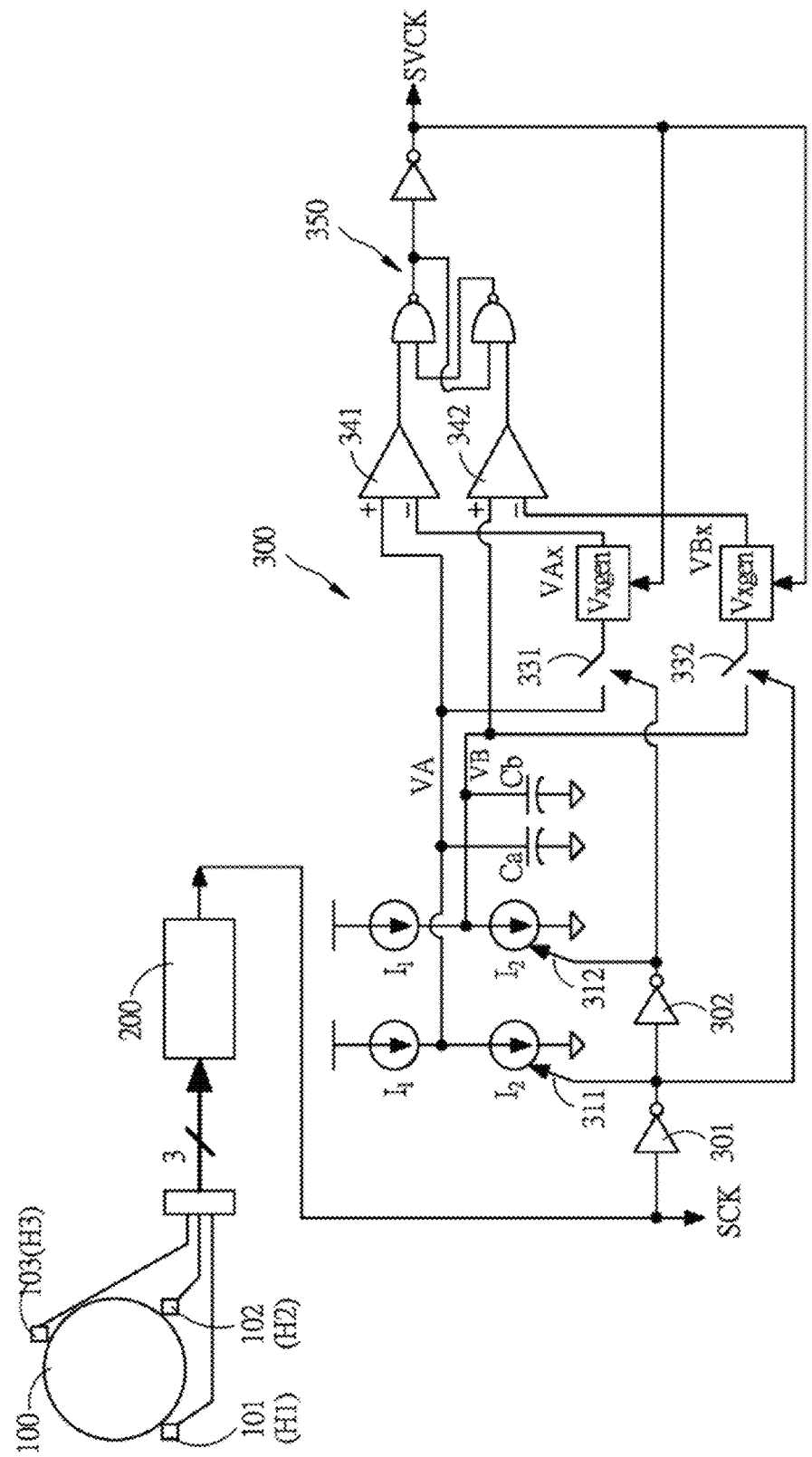
FIG. 2 is a schematic diagram showing sensing signal inputs of Hall components and an angle cutting circuit.
Figure 3:
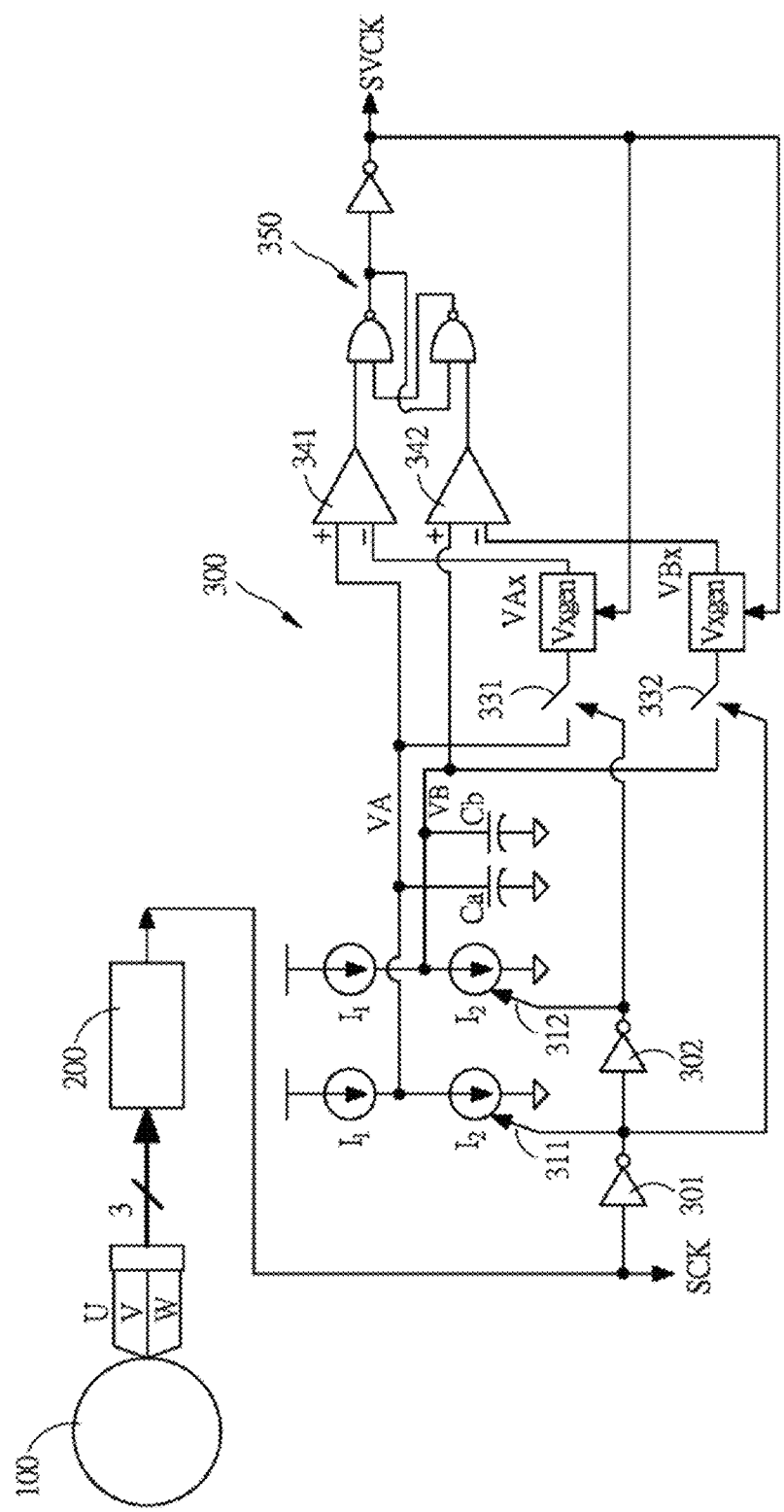
FIG. 3 is a schematic diagram showing a sensorless motor drive system and the angle cutting circuit.

FIG. 2 and FIG. 3 are a schematic diagram showing sensing signal inputs of Hall components and an angle cutting circuit, and a schematic diagram showing a sensorless motor drive system and the angle cutting circuit. In an implementation, the sensing signals H of the motor 100 are Hall signals H1, H2, H3 (as shown in FIG. 2) output by at least two Hall components (three Hall components 101, 102, 103 in this embodiment); or the sensing signals H of the motor 100 are drive output voltage signals UVW of the motor 100 (as shown in FIG. 3), the drive output voltage signals UVW replaces the Hall components 101, 102, 103 and the Hall signals H1, H2, H3 thereof, and the rest subsequent implementations are the same in applications. The subsequent embodiments are described by taking the Hall signals H1, H2, H3 output by the three Hall components 101, 102, 103 as an example.

Figure 4:
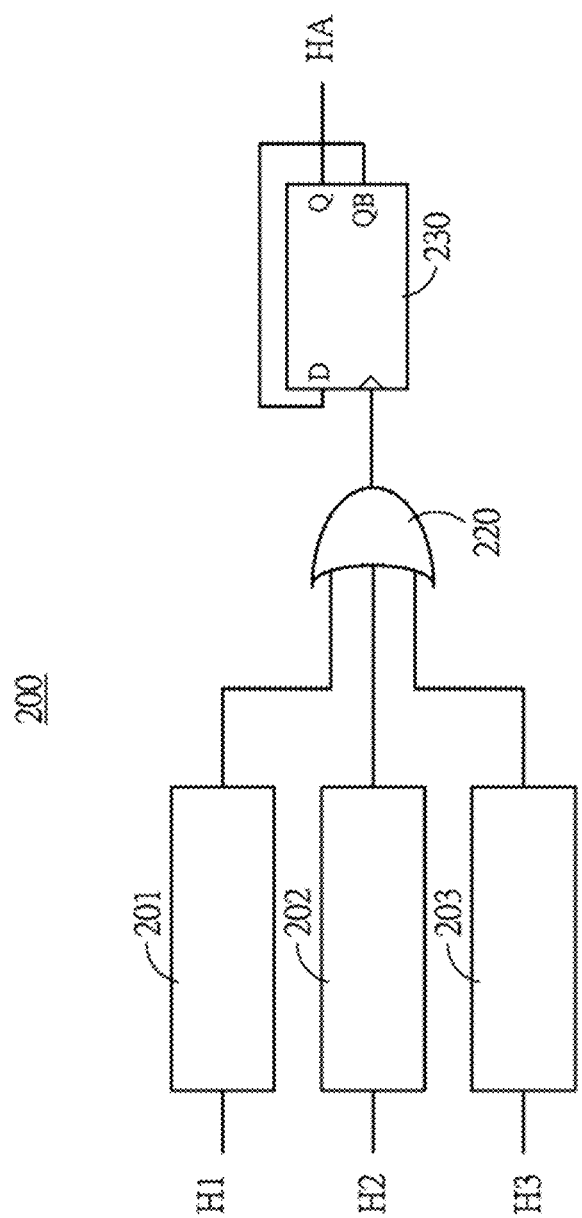
FIG. 4 is a schematic diagram of an edge detection circuit.

Referring to FIG. 4, after the edge detection circuit 200 receives the sensing signals H of the motor 100, each of the sensing signals H (H1, H2, H3) is subjected to pulse edge detection by a multivibrator 201, 202, 203 and output to an OR gate 220 for control to control a circuit clock of a D flip-flop 230, thereby deriving the clock signal SCK. Since the point where the sensing signal is detected is the switching point at which the motor 100 rotates 60 degrees, the derived clock signal SCK generates an angular clock signal HA whose every half cycle represents a 60-degree angle (as shown in a schematic diagram of pulse signals in FIG. 6).

Figure 6:
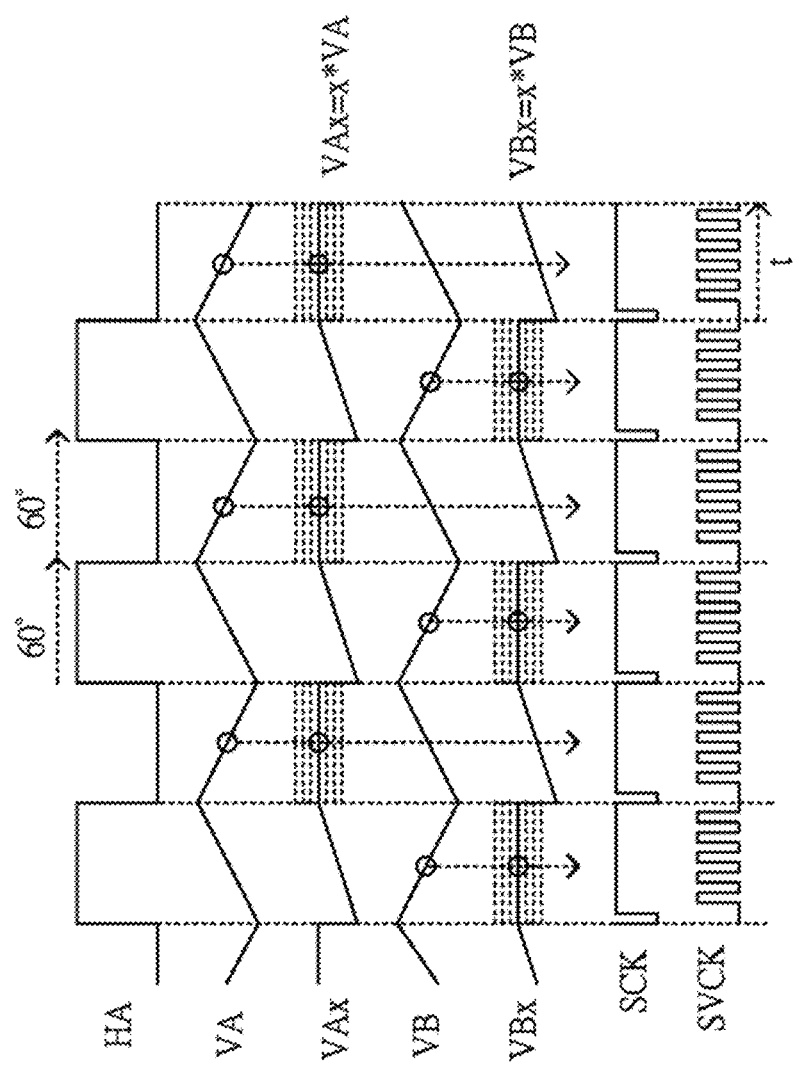
FIG. 6 is a schematic diagram of pulse signals of FIG. 2.

Referring to FIG. 2 and FIG. 3, the angle cutting circuit 300 includes two capacitors Ca and Cb, controlled by switches 311 and 312 controlled by the clock signal SCK to perform constant-current charge and discharge, respectively obtaining triangle wave voltage waveforms of a first voltage VA and a second voltage VB relative to the clock signal SCK (as shown in the schematic diagram of the pulse signals in FIG. 6). In applications, the clock signal SCK controls two inverters 301 and 302 connected in series, and is output to control the switches 311 and 312 of two constant current sources I1 and I2 respectively to perform constant-current charge and discharge on the capacitors Ca and Cb. In a common way, the constant current source I2 is 2 times the constant current source I1, so that the charge and discharge time of the capacitors Ca and Cb is kept the same.

Still referring to FIG. 2 and FIG. 3, the angle cutting circuit also includes two reference voltage generating modules Vxgen, controlled by switches 331 and 332 controlled by the clock signal SCK to respectively receive the first voltage VA and the second voltage VB as inputs, thereby respectively outputting waveform signals of a first x voltage VAx and a second x voltage VBx that are x times the first voltage VA and the second voltage VB, where $0<x<1$; two comparators 341 and 342, respectively receiving the first voltage VA and first x voltage VAx, and the second voltage VB and the second x voltage VBx as inputs, and outputting the angle indication pulse SVCK through a latch 350 (in an implementation, an inverter may be added to the output terminal, and the inverted signal is convenient for design and interpretation) after comparison (as shown in the schematic diagram of the pulse signals in FIG. 6).

Figure 5:
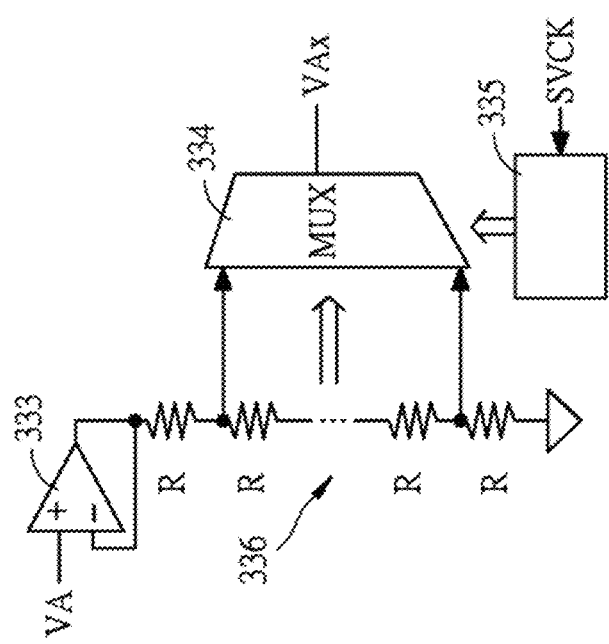
FIG. 5 is a schematic diagram of a reference voltage generating module.

Referring to FIG. 5, taking the first voltage VA as an input as an example in FIG. 5, the reference voltage generating module Vxgen is capable of changing different x times using the angle indication pulse SVCK variation signal. Each of the reference voltage generating modules Vxgen includes an operational amplifier 333, a resistor divider network 336, a multiplexer 334 and a shift register 335. The first voltage VA and the second voltage VB pass through the operational amplifier 333 and generate a plurality of voltage values of different magnitudes to the multiplexer 334 through the resistor divider network (formed by a plurality of identical resistors R connected in series) 336 node, and the angle indication pulse SVCK variation signal controls the multiplexer 334 to switch to different reference potentials through the shift register 335 and output the waveform signals of the first x voltage VAx and the second x voltage VBx, for example, x=5/6, 4/6, 3/6, 2/6, 1/6 in six equal divisions.

The angle indication pulse SVCK sequentially controls the multiplexer 334 to switch to different reference potentials and output the first x voltage VAx at different times (positions where the motor 100 rotates). Since the first voltage VA is at the time where the motor rotates 60 degrees and is expressed by the magnitude of the voltage value, the resistors R are designed in an equal ratio. For example, in 12 equal divisions, there are 12 resistors R, and each resistor R represents a 5-degree angle. From the top to bottom, the corresponding voltage is changed and supplied to the multiplexer 334, so that 12 divisions each representing a 5-degree angle are sequentially obtained, thereby obtaining 11 angle indication pulses SVCK.

Referring to FIG. 6, every half cycle of the angular clock signal HA obtained by the edge detection circuit 200 represents a 60-degree angle. The clock signal SCK is an indicating short pulse signal every 60 degrees. For example, by 6 equal divisions, it can be concluded that the angle indication pulse SVCK has 5 indicating signals in every 60 degrees.

Figure 7:
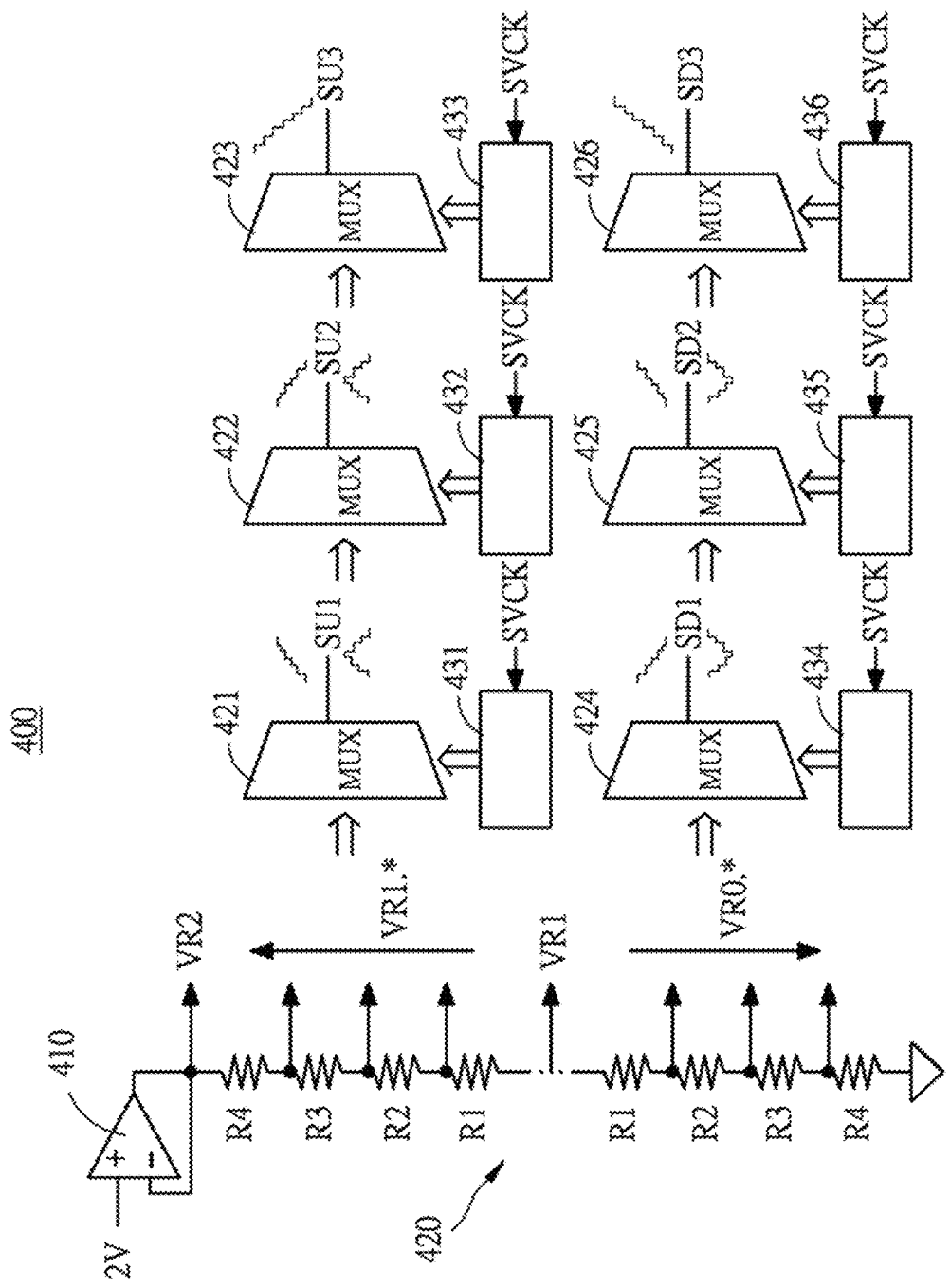
FIG. 7 is a schematic diagram of a synthetic wave generating circuit.

Referring to FIG. 7, the synthetic wave generating circuit 400 includes an operational amplifier 410, a Sin value resistor divider network 420, and six sets of multiplexers 421, 422, 423, 424, 425, 426 and shift registers 431, 432, 433, 434, 435, 436, with a 2 V voltage and through division by the Sin value resistor divider network 420, the operational amplifier 410 controls the multiplexers 421, 422, 423, 424, 425, 426 to switch to different reference potentials through the shift registers 431, 432, 433, 434, 435, 436 by the angle indication pulse SVCK variation signal and output six sets of different output waveform voltage signals SU1, SU2, SU3, SD1, SD2, SD3.

Each of the six sets of the multiplexers 421, 422, 423, 424, 425, 426 and shift registers 431, 432, 433, 434, 435, 436 represents change values every time the motor 100 rotates 60 degrees, including SU1-3 and SD1-3. SU1-3 are used to generate a 180-degree range of the corresponding sine wave, and are designed to lag behind by 30 degrees, namely 30-90 degrees (SU1, rising), 90-150 degrees (SU2, falling) and 150-210 degrees (SU3, falling fast) sequentially. SD1-3 are used to generate another 180-degree range of the corresponding sine wave, namely 210-270 degrees (SD1, falling), 270-330 degrees (SD2, rising) and 330-30 degrees (SD3, rising fast) sequentially, and the multiplexers 421, 422, 423, 424, 425, 426 are controlled to adopt different reference voltages so that the order of SU1 rising→SU2 falling SU3 falling fast→SD1 falling SD2 rising→SD3 rising fast can be obtained. In a further application, an arbitrary waveform can be generated. Taking the synthetic waveform used for FOC as an example, with only changing SU1/SU2 and SD1/SD2 reference can be obtained the rising/falling potential.

Figure 9:
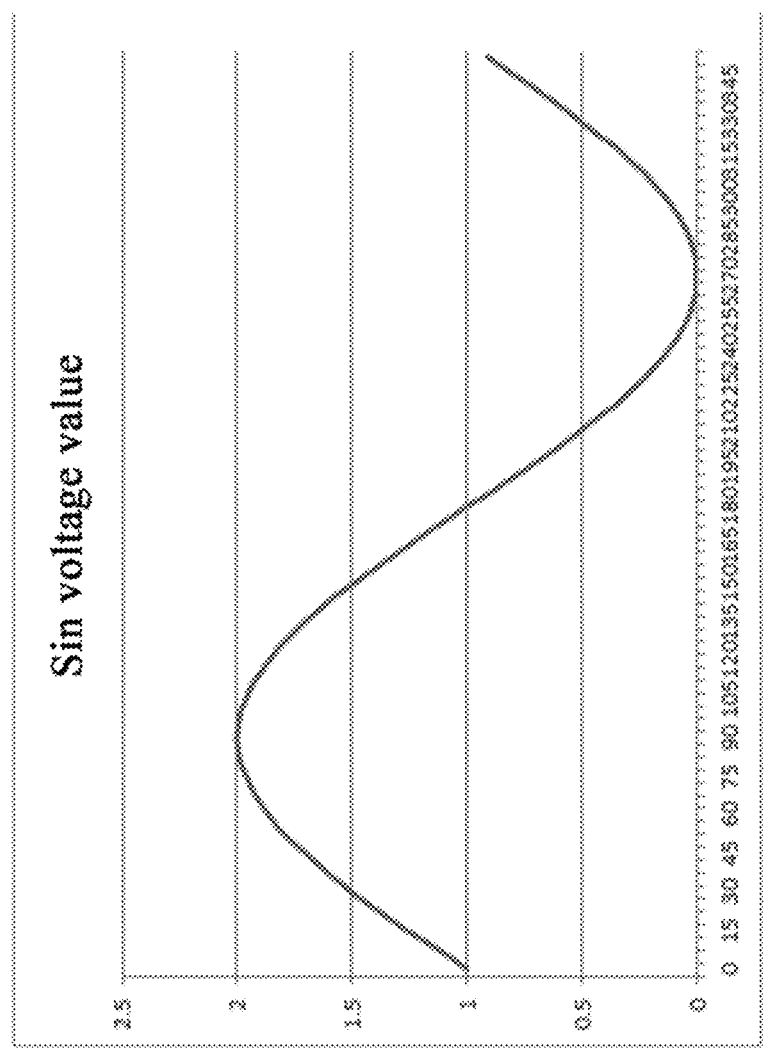
FIG. 9 is a schematic diagram of a Sin voltage value.

FIG. 8 is a table showing the correspondence between sinusoidal Sin value and resistance, and FIG. 9 is a schematic diagram of a Sin voltage value. On such basis, the potential divider network value of the Sin value resistor divider network 420 is designed. Using VR1 as the reference value, SU1-3 are change voltage values every 5 degrees obtained after receiving the 30210-degree Sin values (including VR1.* and partial VR0.* reference values), and SD1-3 are change voltage values every 5 degrees of mirroring downward after receiving the 21030-degree Sin values (VR0.* and partial VR1.* reference values).

Figure 10:
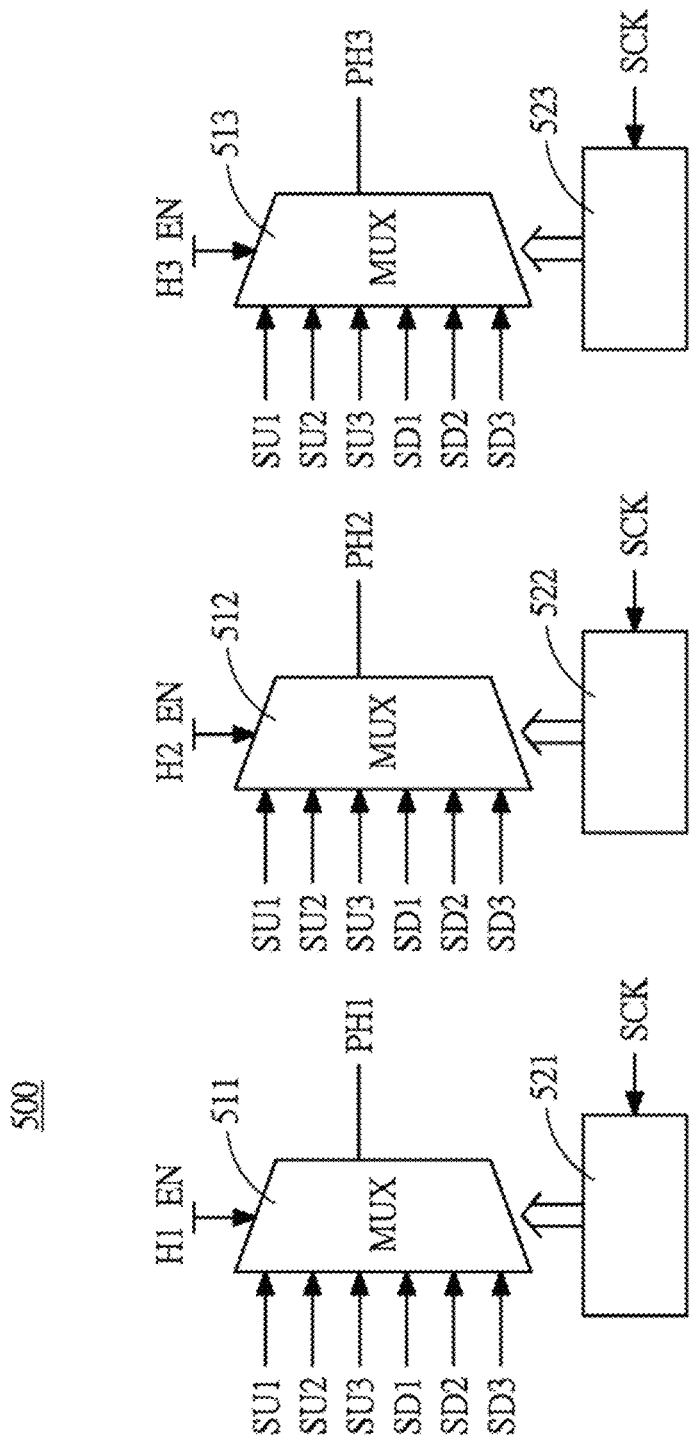
FIG. 10 is a schematic diagram of a signal combining circuit.

FIG. 10 is a three-phase/6-set signal combining circuit. The signal combining circuit 500 includes a plurality of sets of multiplexers 511, 512, 513 and shift registers 521, 522, 523, and the shift registers 521, 522, 523 are controlled by the clock signal SCK to control the multiplexers 511, 512, 513 to combine the waveform voltage signals SU1, SU2, SU3, SD1, SD2, SD3 generated by the synthetic wave generating circuit 400, thereby obtaining a plurality of synthetic waveforms PH (sinusoidal synthetic waveforms PH1, PH2, PH3) provided to the drive system of the motor 100 for control uses. The signal combining circuit 500 combines the 6 groups of partial sinusoidal waveform signals representing 60 degrees to obtain the 3 output signals PH1-PH3 provided to the three-phase motor drive system for control uses. The clock signal SCK is a clock signal every 60 degrees the motor 100 rotates, and the shift registers 521, 522, 523 sequentially outputs SU1→SU2→SU3→SD1→SD2→SD3, so that the sinusoidal synthetic waveforms PH1, PH2, PH3 can be obtained.

Figure 11:
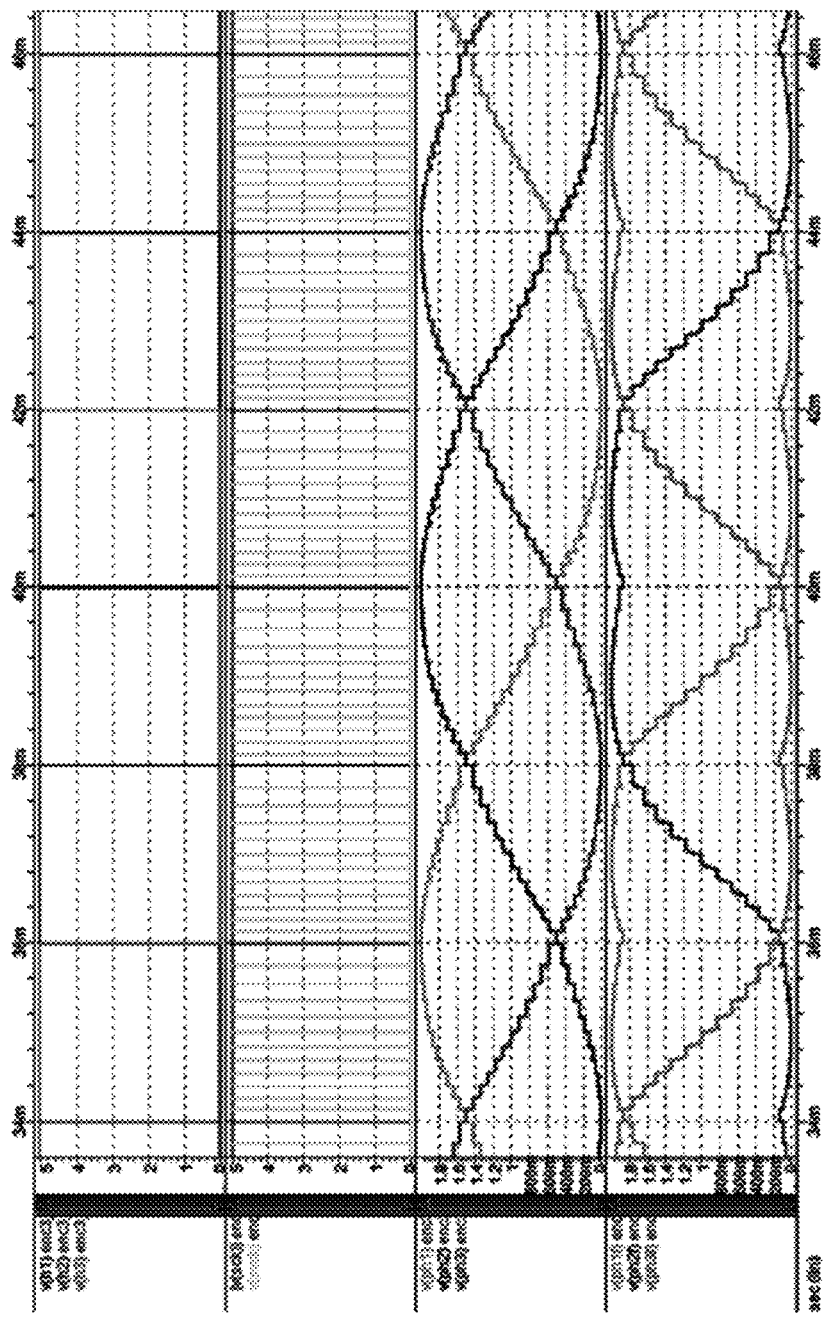
FIG. 11 is a schematic diagram showing the circuit simulation result of three-phase Hall signal inputs according to the disclosure.

The multiplexers 511, 512, 513 of the signal combining circuit 500 bring in the sensing signals H of the motor 100 such that the plurality of synthetic waveforms PH (sinusoidal synthetic waveforms PH1, PH2, PH3) lag an arbitrary angle behind the sensing signal H of the motor 100 and synchronize therewith. As shown in FIG. 11, H1_EN/H2_EN/H3_EN bring in relevant information of Hall signals H1, H2, H3, such that the sinusoidal synthetic waveforms PH1, PH2, PH3 lag 30 degrees behind and synchronize therewith, which is applied to general drive operations. Alternatively, the sinusoidal synthetic waveforms are made to lag an arbitrary angle behind and synchronize therewith, which can be applied to motor drive control theories where the motor magnetic field is behind or ahead.

FIG. 11 shows the actual circuit simulation result of a three-phase motor using Hall signals as sensing signals. v(h1)/v(h2)/v(h3) are 3 Hall input signals, v(sck) is the clock signal for detecting Hall changes, and v(svck) cuts the time of change between the two Hall signals into 12 equal divisions. When the two-interval is a rotation angle of 60 degrees, each equal division is an indicating signal of an angle change of 5 degrees. Of course, the equal division cutting can be designed according to needs. For example, one equal division is 10 degrees in case of 6 equal divisions, 2.5 degrees in case of 24 equal divisions, etc. v(sck) and v(svck) indicating signals are used to sequentially switch to different reference potentials to generate a sinusoidal-like shape. The sine wave is cut into six two-intervals according to 60 degrees. In these six intervals, corresponding reference potential switching values are respectively given in conjunction with the rising and falling of the sine wave to obtain the v(ph1)/v(ph2)/v(ph3) sinusoidal waveforms, and the difference from the Hall signals can be designed to lag behind 30 degrees to push the three-phase motor to make general commutation operation control.

Similarly, changing the corresponding six interval potential switching values can generate, for example, v(ph1f)/v(ph2f)/v(ph3f) waveforms. These synthetic waveforms are applied to an FOC motor drive control system.

Figure 12:
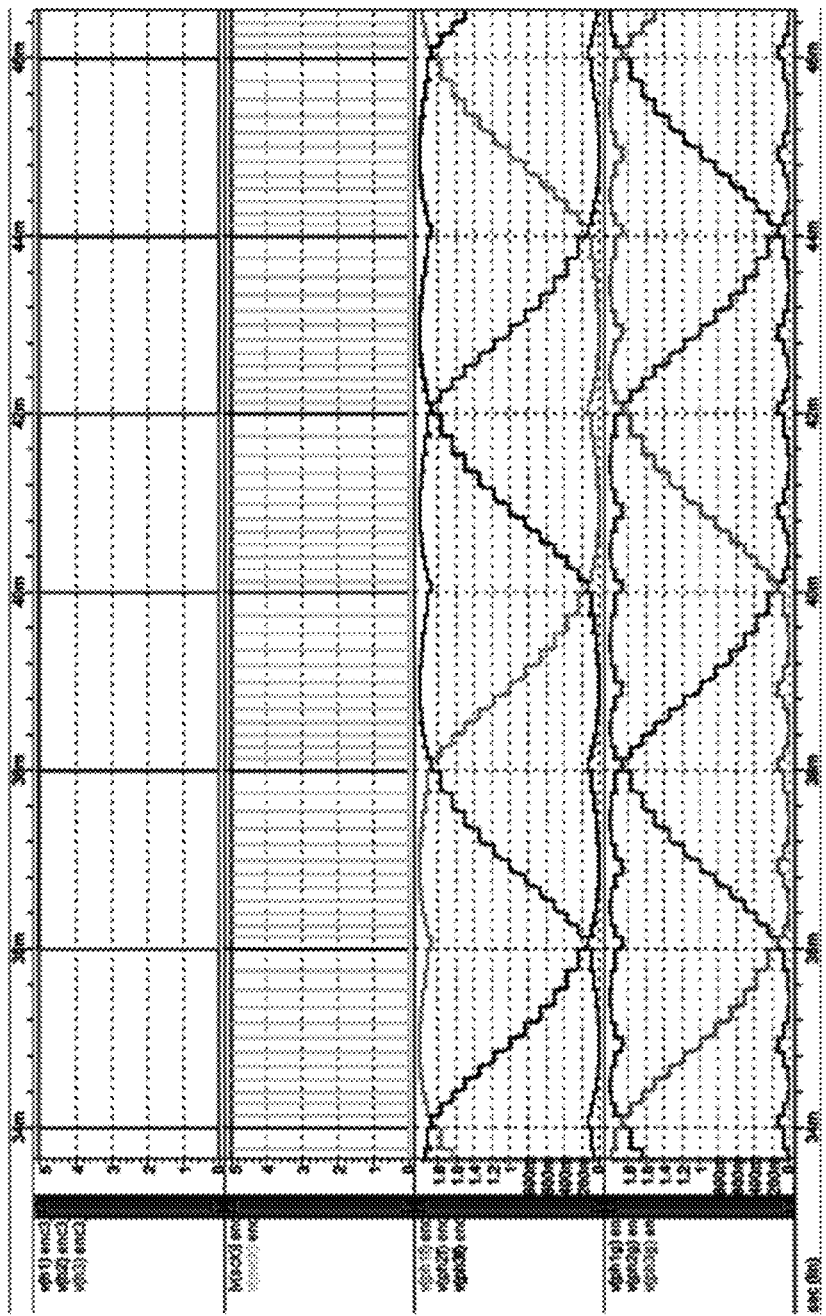
FIG. 12 is a schematic diagram of a derived application of FIG. 11.

In addition, FIG. 12 shows a derived application of FIG. 11. According to the disclosure, technically, corresponding six interval potential switching values can be changed arbitrarily to generate, for example, v(ph1g)/v(ph2g)/v(ph3g) synthetic waveforms, which can be used to analyze the effects on the motor control circuit when different synthetic waveforms are used for motor commutation operation.

Figure 13:
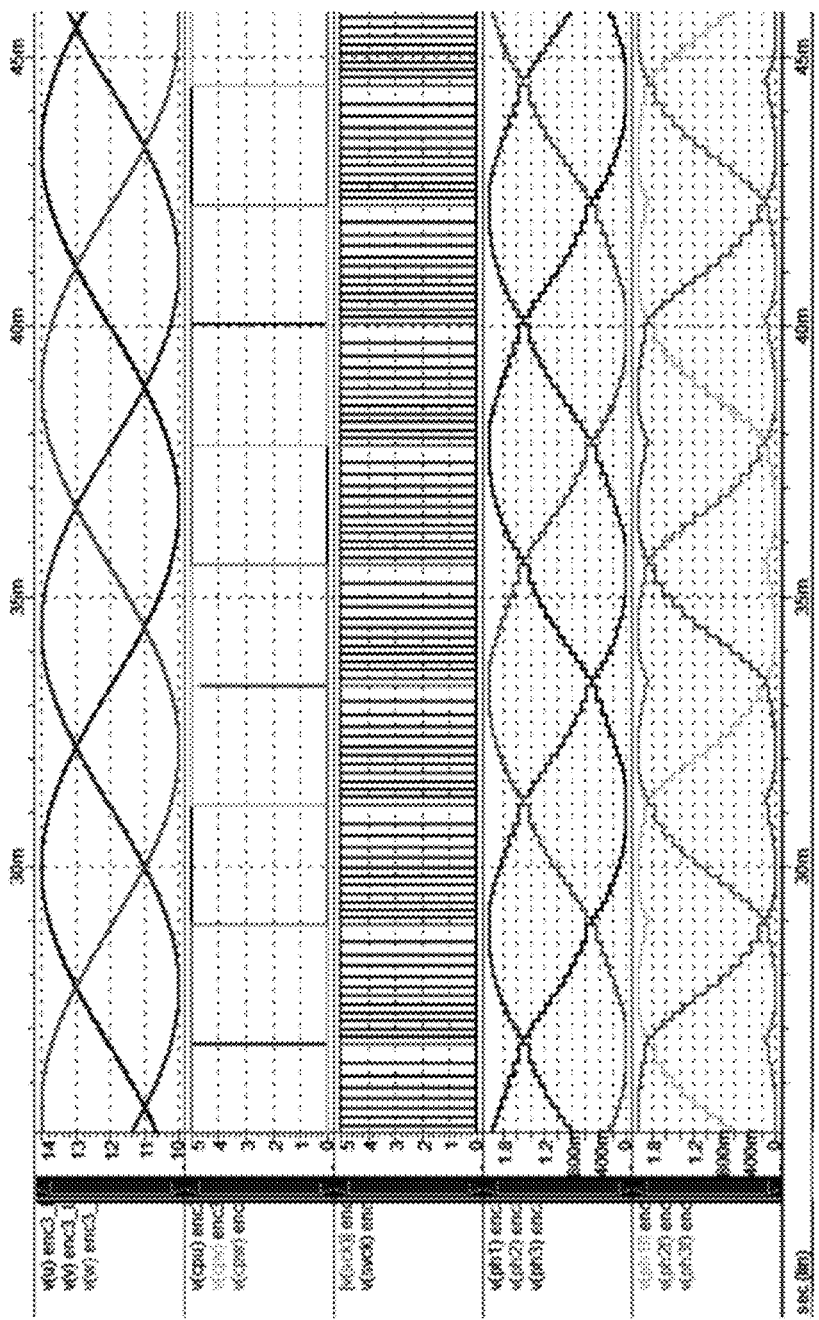
FIG. 13 is a schematic diagram showing the circuit simulation result of drive output voltage signal inputs according to the disclosure.

FIG. 13 is a schematic diagram showing the circuit simulation result of drive output voltage signal inputs according to the disclosure. The circuit is applicable to, for example, a sensorless motor drive control system, that is, there are no input signals of Hall components, encoders or the like. Instead, v(u)/v(v)/v(w) 3 drive-level output voltages can be used as inputs, and the resistor network circuit can be used to detect voltages and make comparison to generate v(cpu)/v(cpv)/v(cpw) Hall-like signals after the processing inside the circuit. The rest is as described above. The v(sck) signal and v(svck) indicating signals are used to sequentially switch to different reference potentials to generate a sinusoidal shape 30 degrees behind and the synthetic waveforms used for FOC.

In a stepping motor application of the disclosure, the stepping motor is controlled to rotate at a clock of each step. For smooth rotation, micro-stepping control technology is mature and developed, with a sinusoidal-like shape. Using the above-mentioned technology, the disclosure can be extended to such stepping motor applications.

Figure 14:
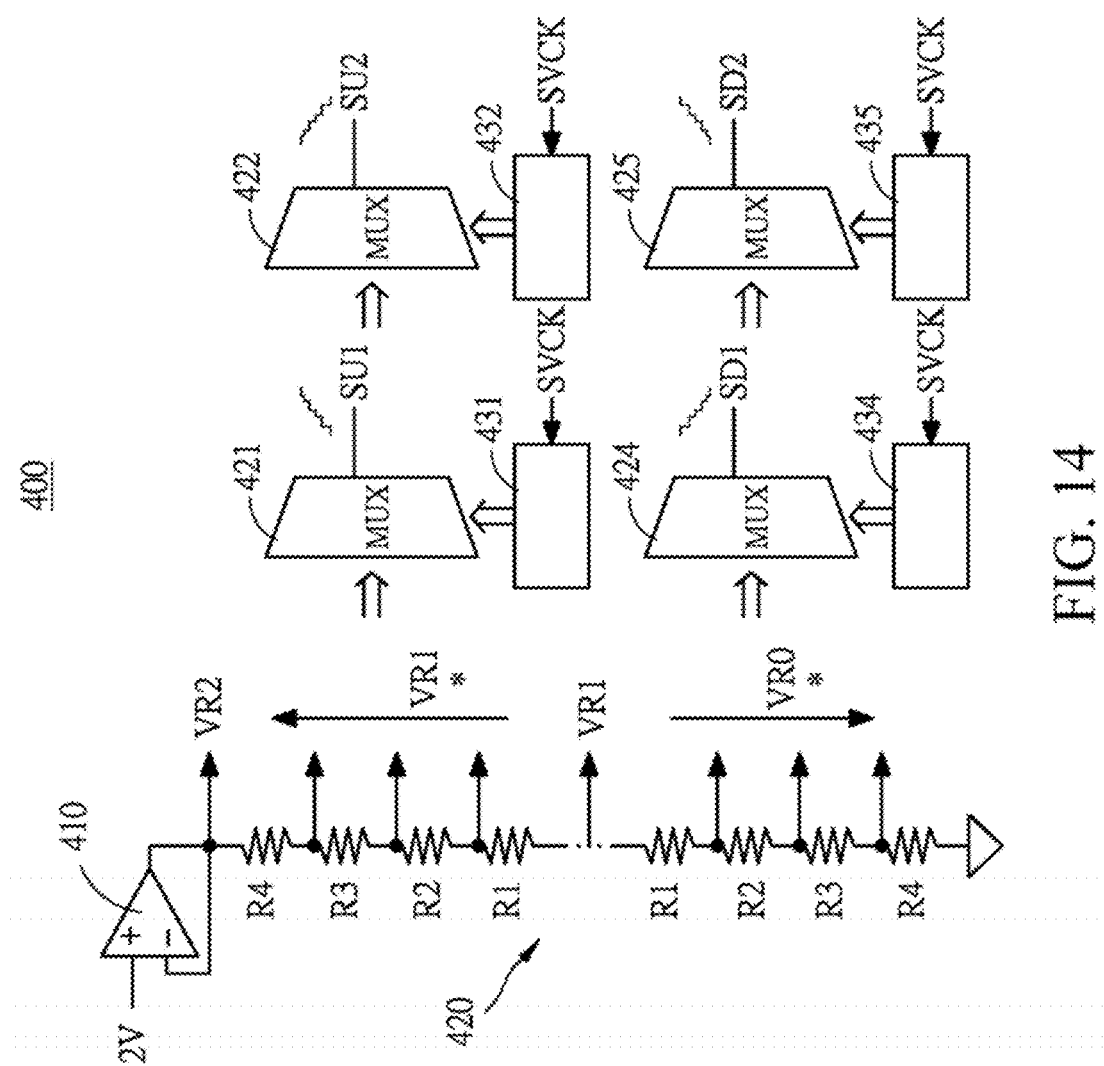
FIG. 14 is a schematic diagram of a synthetic wave generating circuit in a stepping motor application.
Figure 15:
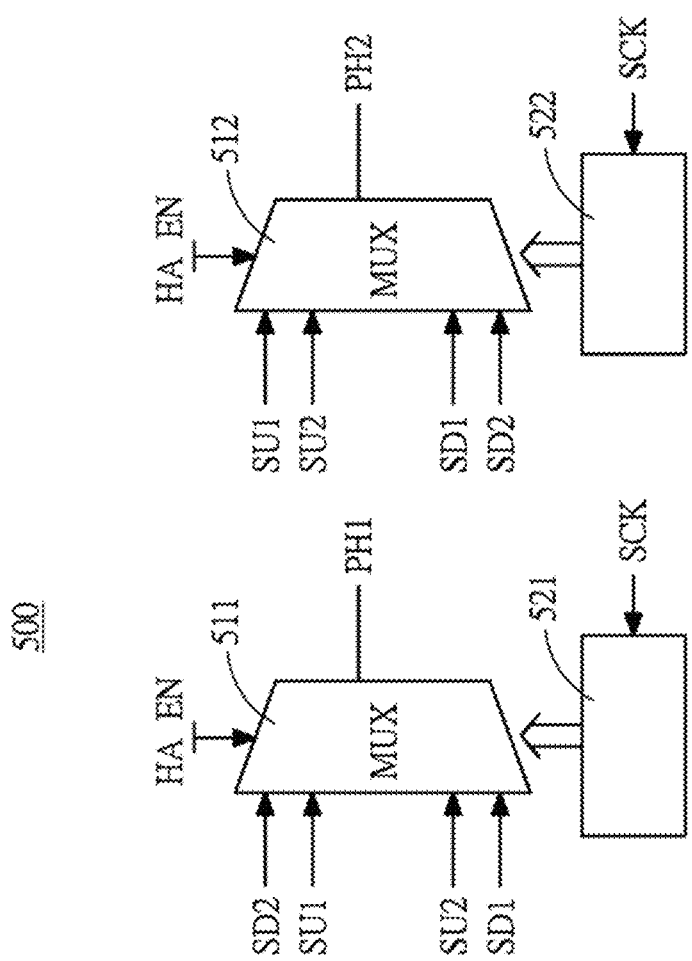
FIG. 15 is a schematic diagram of a signal combining circuit using FIG. 14.

By modifying FIG. 7 and FIG. 10, the synthetic wave generating circuit 400 and the signal combining circuit 500 used in a stepping motor application can be obtained. As shown in FIG. 14 and FIG. 15, the generation manner of sinusoidal synthesis is modified. The arrangement of the sin values is 0-90 degrees, 90-180 degrees, 180-270 degrees and 270-360 degrees, and then the combining order is changed. The sinusoidal synthetic waveform PH1 is SD2→SU1→SU2→SD1, and the sinusoidal synthetic waveform PH2 is SU1→SU2→SD1→SD2, and the difference between the two is 90 degrees. Of course, changing this order can obtain other angles behind or ahead.

The multiplexers 511, 512 of the signal combining circuit 500 bring in the sensing signals H of the motor 100 such that the plurality of synthetic waveforms PH (sinusoidal synthetic waveforms PH1, PH2) lag an arbitrary angle behind the sensing signal H of the motor 100 and synchronize therewith. As shown in FIG. 15, HA_EN brings in relevant information of angular clock signal HA, such that the sinusoidal synthetic waveforms PH1, PH2 lag 30 degrees behind and synchronize therewith, which is applied to general drive operations. Alternatively, the sinusoidal synthetic waveforms are further made to lag an arbitrary angle behind and synchronize therewith, which can be applied to motor drive control theories where the motor magnetic field is behind or ahead.

In addition, the smaller the cutting angles, the smaller and more precise in positioning the stepping angle can be. Further, several clock cycles can be changed to form a sinusoidal increment analytical angle. In the above description, 2 clock cycles form one sine wave, that is, 360 degrees/(4 half cycles*12 division cutting)=7.5 degrees. In applications, the angle may be as small as 360 degrees/(12 half cycles*24 division cutting)=1.25 degrees.

Figure 16:
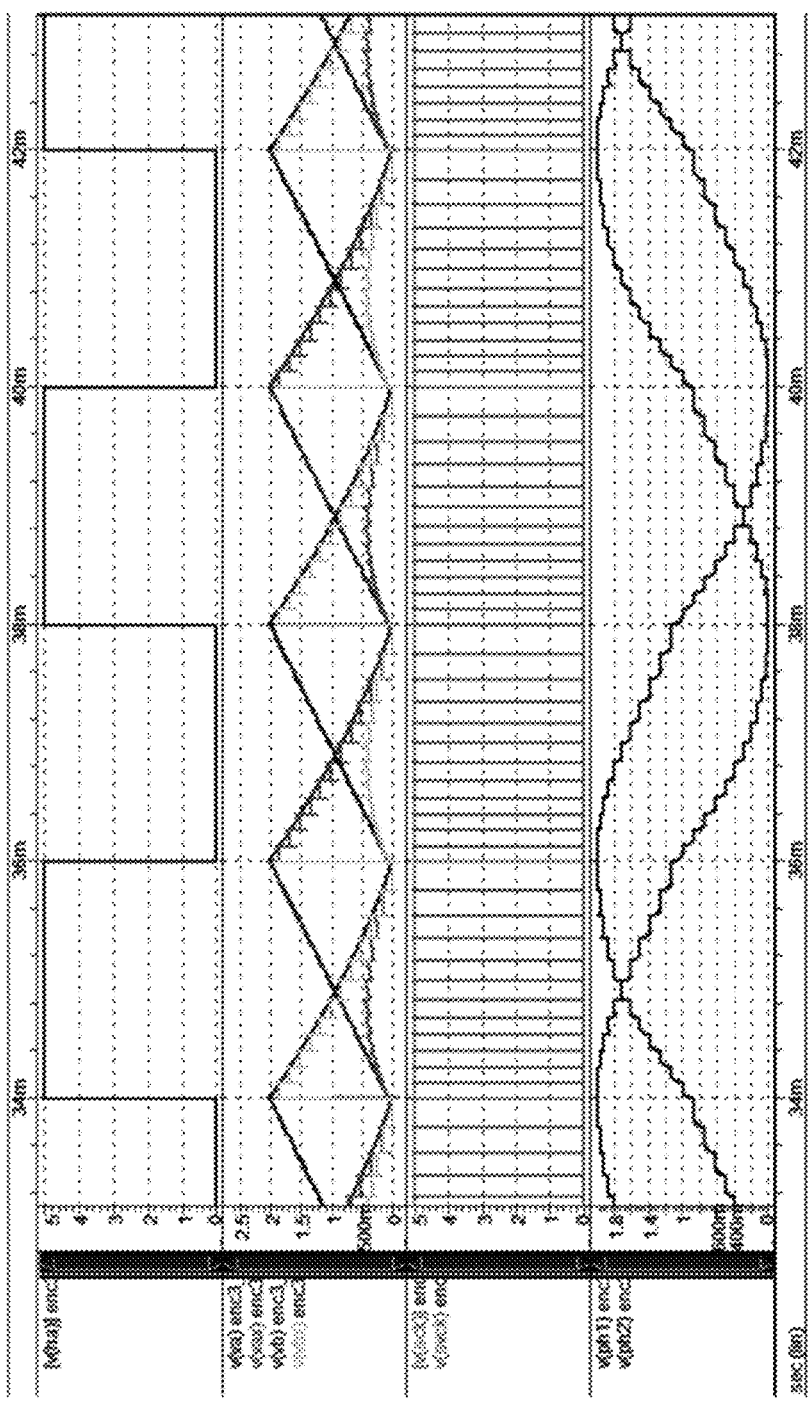
FIG. 16 is a schematic diagram showing the circuit simulation result in a stepping motor application according to the disclosure.

FIG. 16 shows the circuit simulation result in a stepping motor application. As shown in the figure, HA is a stepping square wave signal. Two signal cycles are designed to generate one sinusoidal synthetic waveform ph1, another sinusoidal synthetic waveform ph2 that lags 90 degrees behind the sinusoidal synthetic waveform ph1 is generated. The two sinusoidal synthetic waveforms with a difference of a 90-degree angle can be provided to the stepping motor for micro-stepping control.

12 equal division cutting is implemented as described above, with reference to VA/VAx and VB/VBx waveforms, and the sine wave generation technique is used such that there is a difference of a 90-degree angle between the sinusoidal synthetic waveforms ph1 and ph2, as shown in FIG. 16, thereby completing the micro-stepping motor drive control of the reference waveforms.

The motor commutation waveform generating circuit of the disclosure is applicable to a two-phase, three-phase or multiphase motor drive control system. After signals of sensing components such as Hall components or drive-level output voltage signals are received, corresponding motor commutation synthetic waveforms, such as sinusoidal waveforms or synthetic waveforms used for FOC, are generated, and provided to the motor drive control system for drive control after pulse width modulation.

In applications, the motor commutation waveform generating circuit can be used with Hall components (Hall ICs) to output sinusoidal or FOC synthetic waveforms, and the synthetic waveforms are subjected to PWM signal modulation by the control system to control the motor rotation, which has the same effect as the current common case in which Hall signals are captured by an MCU and subjected to mathematical algorithm operations by an internal circuit of the MCU to generate commutation waveforms. However, the circuit of the disclosure is simple and low in cost, has real-time and quick response to motor rotation, is free from the effect of the performance of MCU instruction cycles, and can be directly integrated with a high-voltage drive-level circuit onto the same single chip. The circuit is easily applicable to a motor drive system, the application including detecting Hall component signal inputs, obtaining a clock signal of a 60-degree angle by comparison, cutting the clock signal into smaller angle indicating signals and finally generating synthetic waveforms.

In addition, the motor commutation waveform generating circuit is applicable to occasions that do not use Hall components. Drive-level output voltages of the motor can be directly detected. By just adding some comparison circuits, the above operations can be performed, such that the clock of the 60-degree angle is obtained by comparison, the clock signal is cut into smaller angle indicating signals, and finally the synthetic waveforms are generated, thereby obtaining sinusoidal waveforms or synthetic waveforms used for FOC. This can be directly applied to a sensorless motor drive system, or mixed with a system with Hall signal detection.

When the motor commutation waveform generating circuit is applicable to a stepping motor drive system, by changing waveform reference voltages and combination manners, two sinusoidal waveforms with a 90-degree difference commonly used in micro-stepping can be generated. The motor commutation waveform generating circuit can easily expand the resolution, and is applicable to small stepping angles of each step.

Although the disclosure has been disclosed with the above examples, it is not intended to limit the disclosure. Equivalent substitutions of changes and modifications made by any person skilled in the art without departing from the spirit and scope of the disclosure still fall within the protection scope of the disclosure.

What is claimed is:

1. A motor commutation waveform generating circuit, configured to generate a commutation synthetic waveform corresponding to a motor that is provided to a drive control system of the motor for drive control after pulse width modulation, the circuit comprising:
   an edge detection circuit, configured to receive sensing signals of the motor and derive a clock signal indicating a commutation switching point of the motor;
   an angle cutting circuit, controlled by the clock signal to generate an angle indication pulse indicating a rotation angle of the motor;

a synthetic wave generating circuit, using the angle indication pulse to sequentially change waveform voltages corresponding to required angles and output them in segments; and a signal combining circuit, controlled by the clock signal to combine waveform voltage signals generated by the synthetic wave generating circuit, thereby obtaining a plurality of synthetic waveforms provided to a drive system of the motor for control uses.

2. The motor commutation waveform generating circuit according to claim 1, wherein the sensing signals of the motor are Hall signals output by at least two Hall components.

3. The motor commutation waveform generating circuit according to claim 1, wherein the sensing signals of the motor are drive output voltage signals of the motor.

4. The motor commutation waveform generating circuit according to claim 1, wherein after the edge detection circuit receives the sensing signals of the motor, each of the sensing signals is subjected to pulse edge detection by a multivibrator and output to an OR gate for control to control a circuit clock of a D flip-flop, thereby deriving the clock signal.

5. The motor commutation waveform generating circuit according to claim 1, wherein the angle cutting circuit comprises two capacitors, controlled by switches controlled by the clock signal to perform constant-current charge and discharge, respectively obtaining triangle wave voltage waveforms of a first voltage and a second voltage relative to the clock signal;

two reference voltage generating modules, controlled by switches controlled by the clock signal to respectively receive the first voltage and the second voltage as inputs, thereby respectively outputting waveform signals of a first x voltage and a second x voltage that are x times the first voltage and the second voltage, wherein 0<x<1; and two comparators, respectively receiving the first voltage and first x voltage, and the second voltage and the second x voltage as inputs, and outputting the angle indication pulse through a latch after comparison.

6. The motor commutation waveform generating circuit according to claim 5, wherein the reference voltage generating module is capable of changing different x times using the angle indication pulse variation signal.

7. The motor commutation waveform generating circuit according to claim 5, wherein each of the reference voltage generating modules comprises an operational amplifier, a resistor divider network, a multiplexer and a shift register, the first voltage and the second voltage pass through the operational amplifier and generate a plurality of voltage values of different magnitudes to the multiplexer through the resistor divider network, and the angle indication pulse variation signal controls the multiplexer to switch to different reference potentials through the shift register and output the waveform signals of the first x voltage and the second x voltage.

8. The motor commutation waveform generating circuit according to claim 1, wherein the synthetic wave generating circuit comprises an operational amplifier, a Sin value resistor divider network, and six sets of multiplexers and shift registers, and with a 2 V voltage and through division by the Sin value resistor divider network, the operational amplifier controls, by the angle indication pulse variation signal, the multiplexers to switch to different reference potentials through the shift registers and output six sets of different output waveform voltage signals.

9. The motor commutation waveform generating circuit according to claim 1, wherein the signal combining circuit comprises a plurality of sets of multiplexers and shift registers, and the shift registers are controlled by the clock signal to control the multiplexers to combine the waveform voltage signals generated by the synthetic wave generating circuit, thereby obtaining a plurality of synthetic waveforms provided to the drive system of the motor for control uses.

10. The motor commutation waveform generating circuit according to claim 9, wherein the multiplexers of the signal combining circuit bring in the sensing signals of the motor such that the plurality of synthetic waveforms lag an arbitrary angle behind the sensing signal of the motor and synchronize therewith.

* * * * *